March 15, 1960 P. A. CHILDS ET AL 2,928,555

MULTIPLE PANEL MOUNTING ARRANGEMENT

Filed Feb. 11, 1954 2 Sheets-Sheet 1

Inventors
P. A. CHILDS - S. F. GOLD -
W. A. G. WALSH
By [signature]
Attorney

March 15, 1960 P. A. CHILDS ET AL 2,928,555

MULTIPLE PANEL MOUNTING ARRANGEMENT

Filed Feb. 11, 1954 2 Sheets-Sheet 2

Inventors
P. A. CHILDS · S. F. GOLD ·
W. A. G. WALSH
By R. P. Morris
Attorney

United States Patent Office 2,928,555

Patented Mar. 15, 1960

2,928,555

MULTIPLE PANEL MOUNTING ARRANGEMENT

Percy Arthur Childs, Stanley Frederick Gold, and William Arthur George Walsh, London, England, assignors to International Standard Electric Corporation, New York, N.Y.

Application February 11, 1954, Serial No. 409,628

Claims priority, application Great Britain February 27, 1953

2 Claims. (Cl. 211—169)

Figure 1:
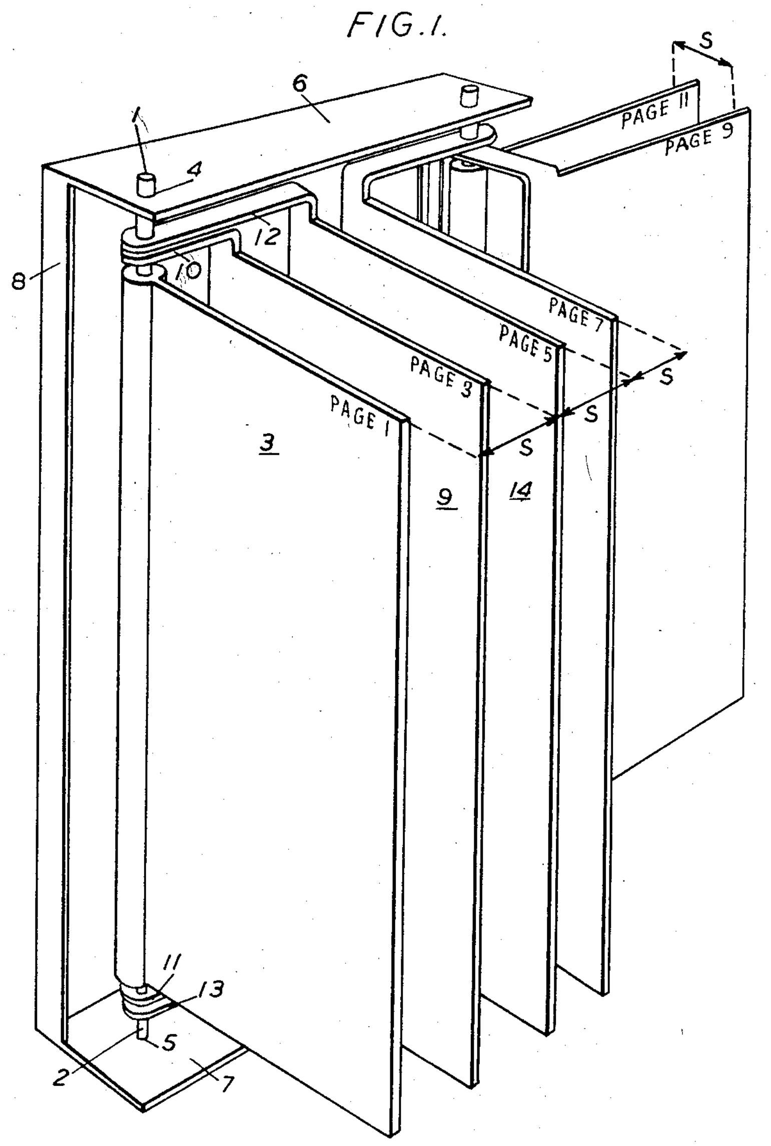

This invention relates to mounting arrangements of the type more particularly, though not exclusively, for use in mounting electronic circuit components.

Considerable work has previously been done in an effort to mount electrical equipment, such as electronic components, in a highly compact manner having regard to maintenance requirements.

One object of the invention is the provision of a mounting arrangement in which a large number of components may be mounted so as normally to occupy the minimum of space and may be separated, even during operation, to provide easy access to any component for inspection and testing and necessary maintenance.

One feature of the invention consists in a mounting arrangement comprising a plurality of members arranged side-by-side in close alignment in a first position and hinged on a common pivot about which each member is rotatable in turn to a similar side-by-side alignment in a second position, and a latch adapted to engage with all said members and to retain said members in position when all said members are in said first position, when all said members are in said second position, and when said members are distributed between said two positions.

Another feature of the invention consists in a mounting arrangement as mentioned in the previous paragraph and comprising a second plurality of members arranged side-by-side in close alignment adjacent said first plurality of members and hinged on a second common pivot about which each member in said second plurality is rotatable in turn away from a first position adjacent said first position of the first plurality of members to a second position, and a second latch adapted to engage with all the members in said second plurality and to retain them in position when all of them are in their first position, when all of them are in their second position, and when they are distributed between the two positions.

A further feature of the invention consists in a mounting arrangement for electronic circuit components comprising a supporting framework, a bearing pivot on said framework, a plurality of panels rotatably mounted on said pivot so as to project in close parallel alignment in front of the framework and arranged for the mounting and inter-wiring thereon of a number of electronic components, a first back stop for engagement by one of said panels when in position in front of the framework, a second back stop for engagement by said panels in a second position substantially at right angles to said position in front of the framework, and latching means mounted on said framework for engagement with a portion of each panel and which in one position of the latch restrains the panels against one or other of the back stops and which in another position of the latch allows the panels to be rotated in sequence from position in front of the framework to said second position and vice versa.

Figure 2:
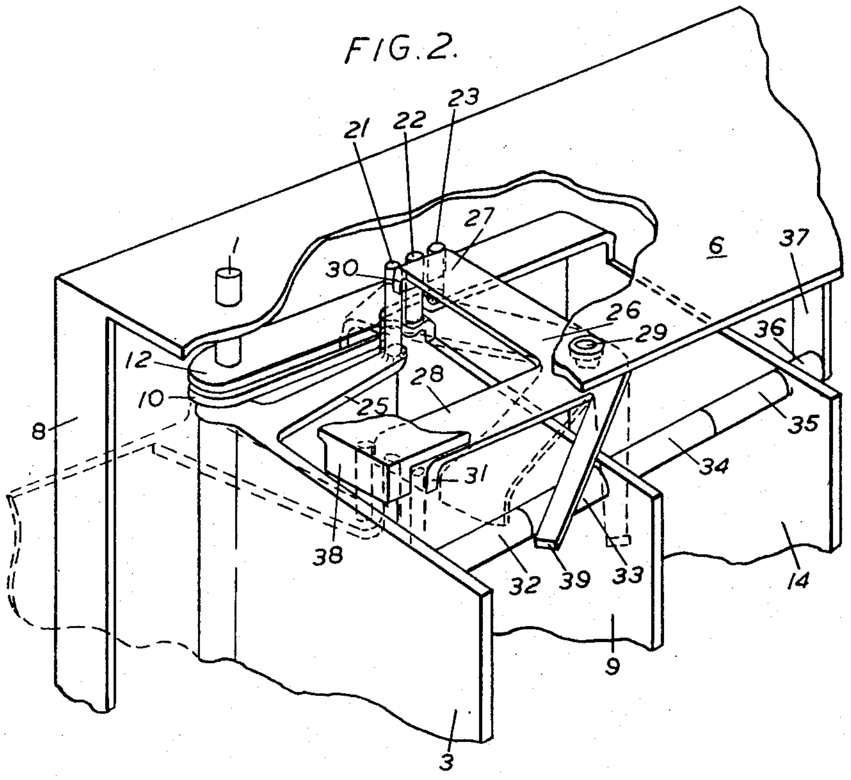

These and other features of the invention will be understood from the following description of one embodiment read in conjunction with the accompanying drawing in which:

Fig. 1 is a front perspective view of a mounting having a number of hinged panels, and Fig. 2 is a perspective view (with the top plate cut away) of a hinging and latching arrangement for some of the panels shown in Fig. 1.

In both Figs. 1 and 2 all details not essential to the understanding of the invention have been omitted for the sake of clarity.

An equipment is built up by arranging a number of components in an appropriate pattern on the surfaces of sections of insulating material, to which they are fixed.

One such section, or any convenient number of sections joined edge to edge in a single plane, comprise what will be called a page of the equipment. Each page is provided with terminals, usually arranged along one edge in a line, this edge being usually one of the longer edges of a rectangular page. Pages are arranged in pairs back-to-back, comprising what will be called a leaf of equipment.

A number of such leaves may be grouped to comprise what will be called a book of equipment, and it will be seen that the use of these terms, page, leaf, and book, help to make clear by analogy the method of providing access by folding or hinging the leaves.

The particular book to be described employs four or six leaves with eight or twelve pages, but the principle will extend to cover the use of any convenient number of pages and leaves in a book.

The leaves of a book of equipment are mounted side by side with the minimum clearance required for satisfactory operation. Each leaf is required to fold through an angle of about 90° to provide access, and it is convenient to fold the leaves outwardly from the middle, so that in a four-leaf book the first two leaves fold to the left and the second two leaves fold to the right.

Those leaves which fold to the same side, fold on a common pivot. With the leaves arranged with each page in a vertical plane, the pivot line is vertical and is arranged in a position of convenience, for example on the center line of the outer leaf and slightly behind its back edge, along which the terminals (not shown) of the two pages are disposed.

Flexible connections (not shown) are taken from these terminals to a connecting block on the equipment or to other leaves.

Turning now to Fig. 1, pivot studs 1, 2, extend from the outer leaf 3 at the top and bottom to engage bearing holes 4, 5, in the top and bottom supporting plates or arms 6, 7, respectively, on the framework 8.

The second leaf 9 carries offset crank arms 10, 11, top and bottom, with recesses therein to provide bearing portions engaging studs 1 and 2, respectively on the outer leaf 3, between that leaf and the supporting plates 6 and 7.

The third leaf 14 carries similar crank arms 12, 13 but further offset, and having recesses therein engaging the same studs between the crank arms of the second leaf, and the supporting plates.

By this means it will be seen that page one, numbering from left to right, is accessible with all leaves, closed pages two and three are accessible with the first leaf folded open, pages four and five are accessible with the first and second leaves folded open, and so on.

It will be seen that by sharing a common pivot in this way, the leaves can be mounted closely together since their spacing S is not reduced by the action of folding on their pivot. In Fig. 1, the two outer right hand leaves are shown folded open.

In order to make easy the testing and replacement of components by locking the leaves in place either when folded open or closed, locking means are provided whereby any leaf may be locked in either position at the limits of rotation on its pivot.

Referring to Fig. 2, which shows a latching arrangement for the left hand panels only of Fig. 1, it being understood that the latching arrangement for the right hand panels is of similar construction but of reverse arrangement. Studs 21, 22, 23, project from the crank arms associated with each leaf, pivoted on the stud 1, parallel to the axis and offset from it.

The studs associated with leaves sharing a pivot are arranged in juxtaposition on a line passing through or near to the axis. For convenience, the studs may be arranged on a line at right angles to the planes of the pages and inside the outer leaf, so that the limits of their movement are within the space occupied by the leaves when folded shut.

It will be seen that in the arrangement shown, the stud 21, associated with the outer leaf 3 is fixed to an offset arm 25, projecting inwardly from it, and the studs 22, 23, associated with the second and third leaves 9, 14 respectively, are fixed to the offset crank arms 10, 12 respectively, linking them to the common pivot 1.

A latch 26 with two arms 27, 28, is arranged to rotate on a pivot 29 attached to the framework on the supporting plate 6 shown partly cut away.

This latch rotates between stops, not shown, through a convenient angle in a plane normal to the leaf pivot and clear of the ends of the locking studs.

On each of the two arms of the latch, lugs 30, 31, project into the path traversed by the locking studs when the leaves are folded, at such positions that the first lug 30 engages any or all of the studs attached to leaves folded fully shut, preventing them from being folded open, and the second lug 31 engages any or all of the studs attached to leaves folded fully open (shown dotted), preventing them from being folded shut.

When the latch 26 is in the released position (shown dotted) the lugs 30, 31 are clear of the path of the studs 21, 22, 23.

Rotation of the leaves 3, 9, 14, about the pivot 1 is limited to a convenient angle, such as 90°, giving the required degree of access, by stops 32, 33, 34, 35, spacing the leaves from each other, by stop 36 on the inner leaf engaging a lug 37 on the support plate 6, and by block 38 engaging studs 21, 22, 23, when the leaves are folded open.

The position taken by the outer leaf when folded open is shown dotted.

It will be seen that the pivot 29 of the latch 26 is located approximately at the intersection of tangents described from the arc traversed by the locking studs, at their limit positions. In this way, the pressure exerted by a disturbed leaf against a lug of the latch produces the minimum tendency to rotate the latch on its pivot.

The latch is operated by means of its operating arm 39, when the leaves are required to be folded open or shut.

It will be seen that the latch is equally effective in locking all the leaves of a group in any combination of positions; for example, with one leaf shut and two open.

The leaves may be more precisely held in their locked positions by shaping the end of the arms of the latch so that their engaging surfaces lie in an arc about the latch pivot as center, and at the same time by shaping the locking studs or by making them of differing diameters so that their points of engagement lie on that same arc.

Extra security of locking of the leaves may be provided by arranging at the other end of the leaves, on the bottom support plate, a similar latch of reverse arrangement engaging appropriately placed locking studs.

A suitably shaped cover may be used to embrace the leaves and the top and bottom plates 6, 7, to protect the electronic equipment against dust and damage.

While the principles of the invention have been described above in connection with specific embodiments, and particular modifications thereof, it is to be clearly understood that this description is made only by way of example and not as a limitation on the scope of the invention.

What we claim is:

1. A mounting arrangement comprising a common U-shaped framework having substantially parallel arms extending along one dimension of the framework and forwardly thereof, common pivot means extending between said arms, a plurality of leaves adapted to pivot about said pivot means from a first position to a second position which second position is substantially perpendicular to said first position, each leaf having a laterally extending arm including a bearing portion cooperatively engaging said pivot means, the bearing portion of each successive leaf arm being further from its associated leaf than the bearing portion of the preceding leaf arm is from its associated leaf whereby said leaves are spaced apart, each of said leaves having a stud projecting therefrom with all the studs located in closely adjacent array and in substantial alignment with a plane which includes the said pivot and substantially parallel to the said one dimension of the framework when said leaves are all moved to a position where they extend substantially perpendicular to said framework, said leaves when turned to a position substantially parallel to said framework having said studs in substantial linear array in a plane substantially perpendicular to the first mentioned plane, a single L-shaped latch element pivotally mounted on one of the arms of said framework, the arms of said latch element having end portions adapted to be brought into respective locking engagement with said studs when said leaves are in either of said positions, said latch element having means for pivoting it out of engagement with all of said studs to permit the movement of said leaves from either of said positions to the other.

2. A mounting arrangement as claimed in claim 1 in which said leaves are in parallel alignment when they are moved to either of said positions.

References Cited in the file of this patent

UNITED STATES PATENTS

| | | |
|---|---|---|
| 574,973 | Wiediger | Jan. 12, 1897 |
| 841,596 | Stevens et al. | Jan. 15, 1907 |
| 1,653,325 | Watts | Dec. 20, 1927 |
| 2,068,460 | Nampa | Jan. 19, 1937 |
| 2,572,665 | Rochow | Oct. 23, 1951 |